United States Patent [19]

Bochory

[11] 3,945,669

[45] Mar. 23, 1976

[54] FASTENER ASSEMBLY
[76] Inventor: Michael E. Bochory, 5000 Centinela Ave., Los Angeles, Calif. 90066
[22] Filed: Mar. 20, 1975
[21] Appl. No.: 560,562

Related U.S. Application Data
[63] Continuation-in-part of Ser. No. 366,299, June 4, 1973, Pat. No. 3,881,753.

[52] U.S. Cl. .................................................. 285/92
[51] Int. Cl.² ......................................... F16J 15/00
[58] Field of Search ....................... 285/92; 24/81 PE

[56] References Cited
UNITED STATES PATENTS
1,385,178   7/1921   Levedahl .............................. 285/92

FOREIGN PATENTS OR APPLICATIONS
319,710   9/1929   United Kingdom .................... 285/92

Primary Examiner—Patrick D. Lawson
Attorney, Agent, or Firm—Michael J. Striker

[57]  ABSTRACT

A fastener assembly for connecting members together comprises abutment means on each of the members and springy retaining means adapted to engage the abutment means on the members and thereby prevent their disconnection.

10 Claims, 8 Drawing Figures

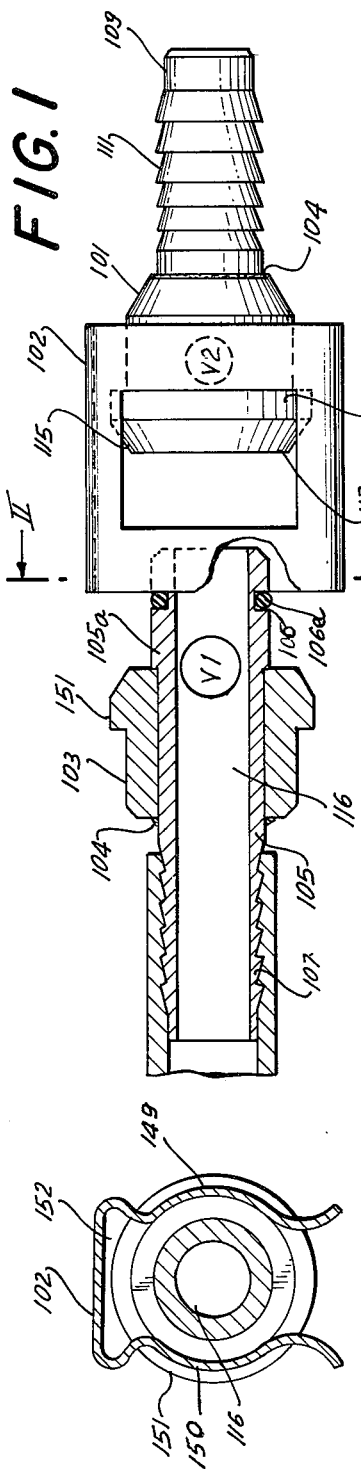
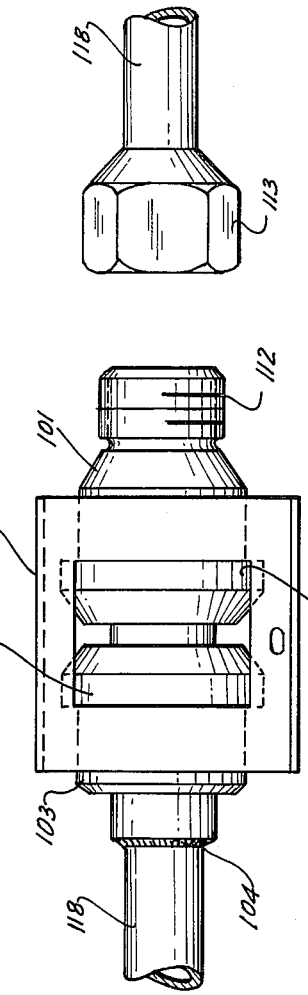
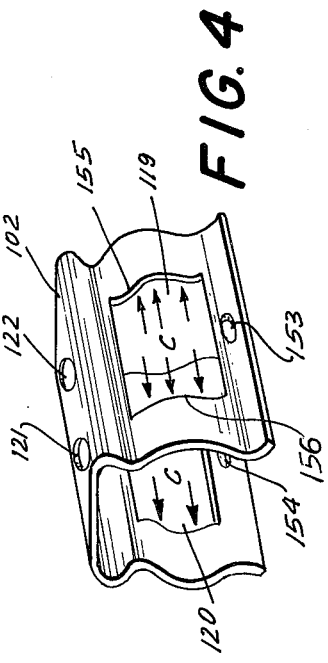
FIG. 1
FIG. 2
FIG. 3
FIG. 4

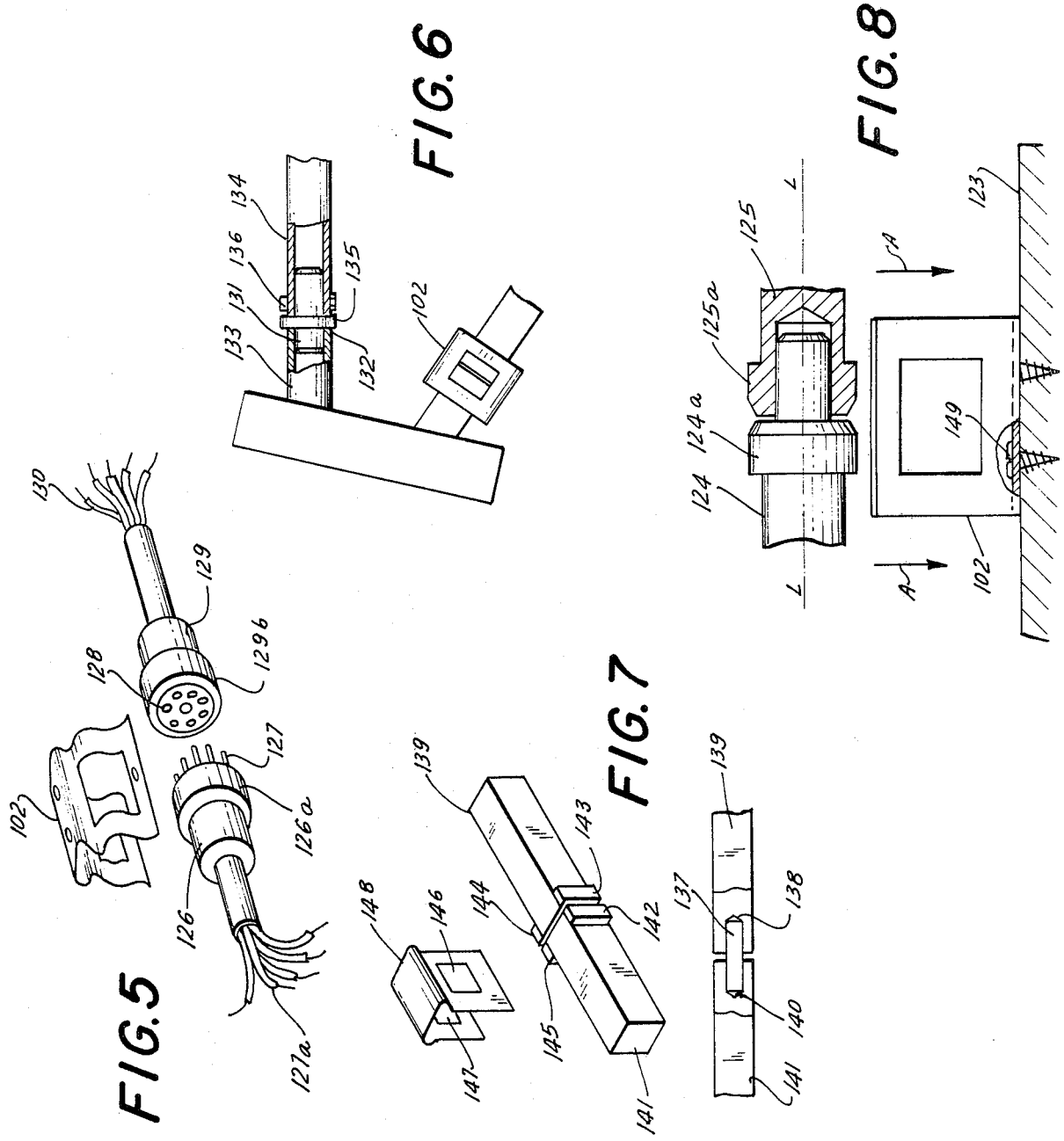

FASTENER ASSEMBLY

CROSS-REFERENCE TO RELATED APPLICATION

This application is a continuation-in-part application of the application having Ser. No. 366,299, filed on June 4, 1973, now U.S. Pat. No. 3,881,753.

BACKGROUND OF THE INVENTION

The present invention relates to a fastener assembly, and more particularly to a quick connect-disconnect fastener assembly.

In the prior art, it is known to connect a member with another member by various means, all of which have disadvantageous aspects. For example, members may be connected by screwing one threaded portion onto another threaded portion, or by means of cooperating ball locks, latches cam locks, or by any similar cooperating wedging elements.

In an environment subject to vibration forces, the prior-art connectors unlock or become disconnected due to this vibrational loading. Thus, additional means are required to prevent this disconnection. Lock washers, specially formed threads, adhesive means, cotter pins, or wiring, are examples of some components which attempt to prevent this undesirable unlocking. However, such additional means are costly to produce, and complex tooling is required to secure such additional means to the members to be connected. If one in the prior art wishes to assure a connection which will not unlock under vibration or similar loading conditions, one must fixedly secure the members together; for example, by soldering or brazing techniques. These techniques, however, have the disadvantage that they cause long delays if one wishes to quickly disconnect the members.

SUMMARY OF THE INVENTION

Accordingly, it is a general object of the present invention to overcome the disadvantages of the prior art.

More particularly, it is an object of the present invention to secure two members together without any screw threaded means or the like coming apart due to vibrational forces.

Another object of the present invention is to provide a quick connect-disconnect fastener assembly.

A further object is to provide a fastener assembly for tubular members which will not disconnect due to high internal pressurized material flowing therethrough.

In keeping with these objects and others which will become apparent hereafter, one feature of the present invention is to provide abutment means on respective first and second members which are adapted to be connected with one another. Springy retaining means are adapted to engage the abutment means on each of these members so as to prevent their disconnection. The springy retaining means is formed of resilient material and has leg portions which are quickly snapped onto said members in contact with the abutment means. Tool-engaging portions are provided to facilitate quick disconnection, when desired. These features overcome the disadvantages of the prior art connectors because the snap fastener or springy retaining means has sufficient strength and flexibility to withstand vibrational and internal tension forces. The members are thereby quickly connected and quickly disconnected without fixedly securing the elements together by using soldering techniques. No long delays are required to quickly disconnect the members, and no costly additional means are needed to secure the members to be connected together.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTON OF THE DRAWINGS

FIG. 1 is a partly sectioned plan view of a first member being axially inserted into the springy retaining means and second member;

FIG. 2 is a view as seen from the line II—II of FIG. 1;

FIG. 3 is a front view of FIG. 1, showing the fastener assembly connected;

FIG. 4 is a perspective view of the springy retaining means;

FIG. 5 is a perspective view of a fastener assembly as related to electrical circuit applications;

FIG. 6 is a partially sectioned view of another embodiment of the present invention;

FIG. 7 is an exploded view of another embodiment of the present invention; and

FIG. 8 is a perspective partly sectioned view showing the already interconnected members normally engaging the springy retaining means.

DESCRIPTON OF THE PREFERRED EMBODIMENTS

Inasmuch as the present application is a continuation-in-part application of the application having Ser. No. 366,299, the entire disclosure of the parent application is herewith incorporated into the present specification by reference.

Referring to the fastener assembly which has been illustrated in FIG. 1, it will be seen that reference numerals 103 and 101 identify the first and second members, respectively. Abutment means or shoulders 151, 151a are respectively provided on the first and second members. The springy retaining means or fastener 102 is adapted to engage abutment means 151, 151a on each of the first and second members 103, 101 as as to prevent their disconnection.

As more clearly shown in FIG. 2, which is a view as seen from line II—II of FIG. 1, the fastener 102 has leg portions 149, 150 which are snapped into the first and second members in contact with the abutment means 151, 151a. The leg portions prevent the axial separation of the members relative to one another.

The members 103 and 101 are provided with bores 116, 117. Therein, tubular components 105, 109 having central internal passages extending axially along line L are received and soldered, brazed, or otherwise securely fastened at the point 104. At one end of the tubular component 105 provided in the first member 103, a male or projecting portion 105a is adapted to be inserted into the corresponding female portion or recess in the corresponding end of the tubular component 109 of the second member 101.

The fastener 102 may snap into engagement with the abutment means provided on both members either after or before the first and second members are connected with each other. As more clearly shown in FIG.

8, the first and second members 124, 125 may be connected with each other along an axially extending line L. Thereupon, the fastener 102 is introduced transversely to the line L in the direction shown by the arrows A so as to fasten the entire assembly.

Alternatively, FIG. 1 shows that the fastener 102 may be snapped onto one of the members, e.g., second member 101, and the other member, i.e., member 103, may be introduced axially in the direction shown by the arrow B. To facilitate this axial insertion, chamfered edges 114, 115 are respectively provided on the first and second members so as to spread the leg portions 149, 150 apart. Any chamfer angle may be used, although a 30° chamfer angle has been found to be preferable in most applications.

Gripping means or attachment means 107, 111 are provided on the outer circumferential surface of the tubular components 105, 109 at the opposite end portions remote from said male portion 105a and female portion. In FIG. 1, the attachment means 107, 111 comprise a plurality of serrations for biting into and/or frictionally retaining additional conduits, such as the flexible hoses or tubing 108 (shown connected to serrations 107 only).

In FIG. 2, the attachment means provided on the opposite end portion remote from the male and female portions comprises threaded portions or screwed fittings 112. Rigid or metallic pipes 118 have cooperating threaded portions 113 which are screwed onto the fittings 112. Alternatively, pipes 118 can be brazed or soldered or otherwise fixedly secured onto the respective first and second members; for example, see first members 103, solered at 104 as shown in FIG. 3.

In the embodiment of FIGS. 1–3, a continuous axially extending internal passage is formed so that solid, fluid, or gaseous materials may be conducted therein. Even under high internal pressure conditions, the fastener 102 is of sufficient strength to prevent disconnection. To improve the sealing of the members, the male end portion 105a is provided with an annular groove 106 which accommodates the sealing means or O-ring seal 106a. The seal 106a is slightly compressed by the inner circumferential wall of the female recess portion and prevents fluid leakage from the interior of the passage to the exterior parts of the members, as is well known in the art.

Valve means V1, V2 are shown provided in first member 103 and in second member 101. The valve V1 and its cooperating valve V2 are respectively situated within the passage of the tubular component 105 and the passage of the tubular member 109 of the second member 101. The valve means V1, V2 are operative to be normally closed so as to block the flow of material through the passages when the first and second members are separated. When the first member 103 is slidably inserted into second member 101, the valve means assume a position in which the valves are open and no longer block the flow of material through the passages, thereby providing open access to the materials to be conducted therein.

The fastener 102 is formed of resilient material, such as resilient metal or synthetic plastic material, and has a cross-section which corresponds to the predetermined cross-section of the first and second members. The fastener 102 further comprises tool-engaging portion 152. To facilitate quick disconnection, a tool such as a lever or screwdriver, is inserted into portion 152, and is operative to snap the fastener 102 off of its assembled position.

FIG. 4, showing the fastener 102 in perspective, illustrates apertures or window portions 119, 120 which are dimensioned to receive the abutment means 151, 151a. This positive interlocking may be disconnected by the tool associated with portion 152 as previously discussed, or by a plier tool, similar to the one manufactured by Waldes in removing snap rings, which engages the holes 153, 154 and expands the leg portions 155, 156 outwardly so as to effect disconnection.

The mounting means 121, 122 receive fastening means, such as screws 149, so as to mount the spring retaining means 102 on a support 123. The supported fastener 102 can support electrical or mechanical harnesses, pipes or hydraulic conduits, such as are commonly found in many industrial applications; for example, the aeronautics industry. Arrows C pictorally indicate the forces which tend to pull the first and second members apart.

FIG. 5 shows another embodiment of the present invention as used in connection with electrical applications. A first electrical cable assembly 126 has chamfered abutting means 126a. A second electrical cable assembly 129 has chamfered abutting means 129b. Each assembly has at least one electrical cable 127a, 130 which are to be interconnected to complete an electrical circuit path. Each cable 127a has prong or bayonette means 127 connected or soldered thereto; and each cable 130 is connected to socket means 128 adapted to receive the prong means 127. The fastener 102 may be initially snapped onto either cable assembly so that the other cable assembly may be axially inserted, or the two cable assemblies may be initially interconnected and the fastener 102 transversely snapped into place, as previously discussed.

FIG. 6 shows an end portion of first structural member 131 inserted into second structural member 134. The other end of the structural member 131 is connected to a frame portion 133. Abutment means 132, 136 are respectively provided on the structural members and cooperate with fastener 102 as described above. It is understood that the fastener assembly may advantageously be used in many applications in which two structural members are to be connected. For example, frame portions are commonly found in folding bicycles or scaffolding applications are especially applicable because of the requirements of having a quick connect-disconnect assembly feature.

FIG. 7 shows that the present invention is not intended to be restricted to circular or tubular components only. Rectangular or square-shaped structural members 139, 141 respectively have abutment means 142, 145 and 143, 144 formed thereon. The abutment means are welded or made integral with said structural members. Axially aligned bores 138, 140, are respectively formed in structural members 139, 141. Shaft 137 maintains the members in alignment during their connection and reinforces the connection so as to protect the structure from anticipated and excessive bending and shearing moments.

The fastener 148 is of correspondingly shaped crosssection with respect to the structural members 139, 141, i.e., rectangularly shaped as compared with the oval shape shown in FIG. 2. The abutment means 142, 143 are received in window portion 146; and the abutment means 144, 145 are received in window portion 147.

FIG. 8 shows first member 124 with its abutment portion 124a inserted into second member 125 with its abutment means 125a. When fastener 102 is supported on support 123 by means of screws 149, the interconnected members 124, 125 may be snapped into place by moving the same in the direction of the arrow A.

It will be understood that each of the elements described above, or two or more together, may also find a useful application in other types of a fastener assembly differing from the types described above.

While the invention has been illustrated and described as embodied in a fastener assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A fastener assembly comprising a first member; a second member adapted to be connected with said first member; abutment means provided on said first and second members, respectively; and springy retaining means adapted to engage said abutment means on each of said first and second members so as to prevent their disconnection.

2. A fastener assembly as defined in claim 1, wherein said springy retaining means has leg portions which are snapped onto said members in contact with said abutment means so as to prevent the axial separation of said members.

3. A fastener assembly as defined in claim 1, wherein said springy retaining means has a tool-engaging portion to facilitate disconnection, when desired; and mounting means for mounting said springy retaining means on a support.

4. A fastener assembly as defined in claim 1, wherein said members have a predetermined cross-section, and said springy retaining means is formed of resilient material which assumes a corresponding cross-sectional configuration.

5. A fastener assembly as defined in claim 1, wherein said members are adapted to accommodate tubular components having axially extending passages; and further comprising attachment means on said tubular components for connecting additional conduits thereto.

6. A fastener assembly as defined in claim 5, wherein said additional conduits are flexible hoses, and said attachment means comprises serrations for frictionally retaining said flexible hoses.

7. A fastener assembly as defined in claim 5, wherein said additional conduits are pipes having a threaded end portion, and said attachment means comprises a cooperating threaded portion.

8. A fastener assembly as defined in claim 5, wherein said first member is insertable into said second member, and wherein said tubular components are provided with valve means in said respective passages, said valve means being operative to assume a first position in which said passages are open when said members are insertably connected with each other and a second position in which said passages are closed when said members are disconnected from each other.

9. A fastener assembly as defined in claim 1, wherein said members are adapted to respectively accommodate male and female electrical cable assemblies having respective electrical cables to be wired to each other to complete an electrical circuit path, said male assembly having at least one prong means and said female assembly having at least one cooperating socket means to receive said prong means.

10. A fastener assembly as defined in claim 1, wherein said members have respectively aligned bores; and further comprising an alignment shaft to align said members during connection and to protect the connection from anticipated shearing and bending moments.

* * * * *